US012784715B2

(12) United States Patent
Rectenwald et al.

(10) Patent No.: US 12,784,715 B2
(45) Date of Patent: Nov. 3, 2026

(54) MUSICAL INSTRUMENT AND STAND

(71) Applicant: Rainstick Dreams, LLC, Pittsburgh, PA (US)

(72) Inventors: Noah Rectenwald, Pittsburgh, PA (US); Jaclyn Rectenwald, Pittsburgh, PA (US)

(73) Assignee: Rainstick Dreams, LLC, Pittsburgh, PA (US)

( * ) Notice: Subject to any disclaimer, the term of this patent is extended or adjusted under 35 U.S.C. 154(b) by 293 days.

(21) Appl. No.: 18/610,774

(22) Filed: Mar. 20, 2024

(65) Prior Publication Data

US 2024/0321241 A1 Sep. 26, 2024

Related U.S. Application Data

(60) Provisional application No. 63/626,784, filed on Jan. 30, 2024, provisional application No. 63/491,180, filed on Mar. 20, 2023.

(51) Int. Cl.

| | |
|---|---|
| ***G10D 13/06*** | (2020.01) |
| ***G10D 13/24*** | (2020.01) |
| ***G10G 5/00*** | (2006.01) |

(52) U.S. Cl.
CPC ............ *G10D 13/06* (2013.01); *G10D 13/24* (2020.02); *G10G 5/005* (2013.01)

(58) Field of Classification Search
CPC ........ G10D 13/06; G10D 13/24; G10G 5/005; G10G 5/00; F16M 13/00; F16M 2200/08; A47F 7/0028; A47G 25/12; B43K 23/002; A01G 5/04; A63H 33/108; A63H 33/044
See application file for complete search history.

(56) References Cited

U.S. PATENT DOCUMENTS

| | | | | |
|---|---|---|---|---|
| 2,803,088 A * | 8/1957 | Swann | G09B 23/26 | 403/176 |
| 4,306,485 A * | 12/1981 | Rudkin | G10K 3/00 | 446/419 |
| 5,212,331 A * | 5/1993 | Waldo | G10D 13/10 | 84/404 |
| 5,505,114 A * | 4/1996 | Lawson | G10K 3/00 | 84/404 |
| 11,357,344 B2 * | 6/2022 | Wong | A01G 5/04 | |

(Continued)

FOREIGN PATENT DOCUMENTS

JP 3229112 U * 11/2020

*Primary Examiner* — Erin Kryukova
(74) *Attorney, Agent, or Firm* — The Webb Law Firm

(57) ABSTRACT

A musical instrument includes a housing having an open first end, an open second end, and a sidewall extending therebetween. The housing defines an internal volume. The musical instrument also includes: a first end cap covering the open first end of the housing; a second end cap covering the open second end of the housing; a barrier disc positioned in the internal volume dividing the internal volume into an upper portion and a lower portion; a first plurality of ribs positioned in the upper portion of the musical instrument arranged in a first pattern; a second plurality of ribs positioned in the lower portion of the musical instrument arranged in a second pattern; a first particle fill material in the upper portion of the internal volume; and a second particle fill material in the lower portion of the internal volume.

23 Claims, 15 Drawing Sheets

(56) References Cited

U.S. PATENT DOCUMENTS

| | | | | |
|---|---|---|---|---|
| 2004/0040923 | A1 * | 3/2004 | Wolff | A47G 7/041<br>431/296 |
| 2009/0286656 | A1 * | 11/2009 | Okamoto | A63B 19/04<br>482/78 |
| 2013/0244530 | A1 * | 9/2013 | Renfro | A63H 33/088<br>446/124 |
| 2023/0114267 | A1 * | 4/2023 | Wilson, IV | A63H 33/008<br>446/120 |

* cited by examiner

MUSICAL INSTRUMENT AND STAND

CROSS REFERENCE TO RELATED APPLICATIONS

The present application claims the benefit of U.S. Provisional Patent Application No. 63/491,180, entitled "Musical Instrument," filed Mar. 20, 2023, and U.S. Provisional Application No. 63/626,784, entitled "Stand for an Elongated Musical Instrument," filed Jan. 30, 2024, the disclosures of which are hereby incorporated by reference in their entireties.

BACKGROUND OF THE INVENTION

Field of the Invention

The present application relates to musical instruments and related accessories, such as stands and supports for musical instruments, and, more specifically, to musical instruments (often referred to as rain sticks) configured to create rain-like sounds and stands for supporting such instruments in an upright orientation.

Description of Related Art

Musical instruments for mimicking or producing sounds representative of rainfall, often referred to as rain sticks, often include a single tube with a plurality of protruding structures, such as rods or dowels, protruding into and distributed throughout an internal volume of the tube. Such instruments also include a particle fill material, such as beads, seeds, or beans, enclosed within the tube. Sounds are produced as the particles of the fill material fall through the tube by gravity. Sounds produced by conventional rain sticks can be limited by the size of the tube and amount of particle fill material enclosed within the tube. Sounds produced by rain sticks can also be limited by the material of the tube, as well as by the size, configuration, and orientation of protruding structures extending through the tube. While conventional rain stick designs produce pleasing sounds, there is a need for new musical instrument arrangements and designs capable of producing unique sounds and/or a wider variety of sounds. There is also a need for accessories, such as supports and stands, for making such instruments easier to use and store. The musical instruments and stands of the present disclosure are provided to address these issues.

SUMMARY OF THE INVENTION

According to an aspect of the disclosure, a musical instrument includes a housing having an open first end, an open second end, and a sidewall extending therebetween. The housing defines an internal volume. The musical instrument also includes: a first end cap covering the open first end of the housing; a second end cap covering the open second end of the housing; a barrier disc positioned in the internal volume dividing the internal volume into an upper portion and a lower portion; a first plurality of ribs positioned in the upper portion of the musical instrument arranged in a first pattern; a second plurality of ribs positioned in the lower portion of the musical instrument arranged in a second pattern; a first particle fill material in the upper portion of the internal volume; and a second particle fill material in the lower portion of the internal volume.

According to another aspect of the disclosure, a musical instrument includes a housing comprising an upper end, a lower end, and a sidewall extending therebetween. The housing defines an internal volume. The musical instrument also includes: a barrier disc positioned in the internal volume dividing the internal volume into an upper portion and a lower portion; a plurality of upper ribs positioned in the upper portion of the musical instrument arranged in a first pattern; and at least two upper open discs positioned in the upper portion of the musical instrument. The plurality of upper ribs are disposed between the at least two upper open discs. The musical instrument also includes upper particle fill material enclosed in the upper portion of the internal volume, as well as a plurality of lower ribs positioned in the lower portion of the musical instrument arranged in a second pattern and at least two lower open discs positioned in the lower portion of the musical instrument. The plurality of lower ribs are disposed between the at least two lower open discs. The musical instrument also includes lower particle fill material enclosed in the lower portion of the internal volume.

According to another aspect of the disclosure, a musical instrument assembly includes any of the previously described musical instruments and a stand for supporting the musical instrument. The stand includes a plurality of elongated members and a plurality of hubs with multiple channels configured to receive ends of the plurality of elongated members. The plurality of elongated members and the plurality of hubs are connected together forming an open frame configured for the musical instrument to be inserted into or through the frame and to support the musical instrument in an upright orientation.

According to another aspect of the disclosure, a stand for supporting an elongated musical instrument is provided. The musical instrument includes a first end, a second end, and a sidewall extending therebetween. The stand includes a plurality of elongated members and a plurality of hubs with multiple channels configured to receive ends of the plurality of elongated members. The plurality of elongated members and the plurality of hubs are connected together forming an open frame configured for the elongated musical instrument to be inserted into or through the frame and to support the elongated musical instrument in an upright orientation.

Preferred and non-limiting examples of the present disclosure will now be described in the following numbered clauses:

Clause 1: A musical instrument comprising: a housing comprising an open first end, an open second end, and a sidewall extending therebetween, the housing defining an internal volume; a first end cap covering the open first end of the housing; a second end cap covering the open second end of the housing; a barrier disc positioned in the internal volume dividing the internal volume into an upper portion and a lower portion; a first plurality of ribs positioned in the upper portion of the musical instrument arranged in a first pattern; a second plurality of ribs positioned in the lower portion of the musical instrument arranged in a second pattern; a first particle fill material in the upper portion of the internal volume; and a second particle fill material in the lower portion of the internal volume.

Clause 2: The musical instrument of clause 1, wherein the housing comprises a transparent or translucent material.

Clause 3: The musical instrument of clause 1 or clause 2, wherein the first plurality of ribs extend through openings in the sidewall of the housing and through the upper portion of the internal volume.

Clause 4: The musical instrument of any of clauses 1-3, wherein the first particle fill material and/or the second particle fill material comprises seeds.

Clause 5: The musical instrument of any of clauses 1-4, wherein the first particle fill material and/or the second particle fill material comprises glass beads.

Clause 6: The musical instrument of any of clauses 1-5, wherein the first particle fill material and the second particle fill material comprise a same type of material.

Clause 7: The musical instrument of any of clauses 1-6, further comprising at least one first open disc positioned in the upper portion of the internal volume and at least one second open disc positioned in the lower portion of the internal volume.

Clause 8: The musical instrument of clause 7, wherein the at least one first open disc and the at least one second open disc comprise a through-hole extending between a first surface and a second surface of the at least one first open disc or the at least one second open disc.

Clause 9: The musical instrument of clause 8, wherein a central axis of the at least one first open disc and/or the at least one second open disc is aligned with the through-hole of the at least one first open disc and/or the at least one second open disc.

Clause 10: The musical instrument of clause 8 or clause 9, wherein the through-hole of the at least one first open disc comprises a first diameter and the through-hole of the at least one second open disc comprises a second diameter, which is different than the first diameter.

Clause 11: The musical instrument of any of clauses 1-10, further comprising: multiple first open discs positioned in the upper portion of the internal volume for guiding the first particle fill material through the upper portion, the multiple first open discs comprising a first opening having a first diameter; and multiple second open discs positioned in the lower portion of the internal volume for guiding the second particle fill material through the lower portion, the multiple second open discs comprising a second opening having a second diameter, which is different than the first diameter.

Clause 12: The musical instrument of any of clauses 1-11, wherein the first plurality of ribs positioned in the upper portion and/or the second plurality of ribs positioned in the lower portion is arranged in a helical or spiral pattern.

Clause 13: A musical instrument comprising: a housing comprising an upper end, a lower end, and a sidewall extending therebetween, the housing defining an internal volume; a barrier disc positioned in the internal volume dividing the internal volume into an upper portion and a lower portion; a plurality of upper ribs positioned in the upper portion of the musical instrument arranged in a first pattern; at least two upper open discs positioned in the upper portion of the musical instrument, wherein the plurality of upper ribs are disposed between the at least two upper open discs; upper particle fill material enclosed in the upper portion of the internal volume; a plurality of lower ribs positioned in the lower portion of the musical instrument arranged in a second pattern; at least two lower open discs positioned in the lower portion of the musical instrument, wherein the plurality of lower ribs are disposed between the at least two lower open discs; and lower particle fill material enclosed in the lower portion of the internal volume.

Clause 14: The musical instrument of clause 13, wherein the upper particle fill material and/or the lower particle fill material comprises seeds.

Clause 15: The musical instrument of clause 13 or clause 14, wherein the upper particle fill material and/or the lower particle fill material comprises glass beads.

Clause 16: The musical instrument of any of clauses 13-15, wherein the upper particle fill material and the lower particle fill material comprise a same type of material.

Clause 17: The musical instrument of any of clauses 13-16, wherein the at least two upper open discs and/or the at least two lower open discs comprise through-holes.

Clause 18: The musical instrument of any of clauses 13-17, wherein the plurality of upper ribs are arranged in a helical or spiral pattern in the upper portion of the internal volume and/or wherein the plurality of lower ribs are arranged in a spiral pattern in the lower portion of the internal volume.

Clause 19: A musical instrument assembly, comprising: the musical instrument of any of clauses 1-18; and a stand for supporting the musical instrument, comprising: a plurality of elongated members; and a plurality of hubs comprising multiple channels configured to receive ends of the plurality of elongated members, wherein the plurality of elongated members and the plurality of hubs are connected together forming an open frame configured for the musical instrument to be inserted into or through the frame and to support the musical instrument in an upright orientation.

Clause 20: The assembly of clause 19, wherein the stand further comprises a base mounted to the frame for preventing the frame and the musical instrument inserted into or through the frame from tipping over.

Clause 21: The assembly of clause 19 or clause 20, wherein the base of the stand comprises a substantially flat upper surface configured to contact one of the ends of the musical instrument with the sidewall of the musical instrument supported by the frame.

Clause 22: The assembly of clause 21, wherein the plurality of hubs, the plurality of elongated members, and/or the base comprise wood.

Clause 23: The assembly of any of clauses 19-22, wherein the frame forms a polyhedron (e.g., an icosahedron, a dodecahedron, or an octahedron) comprising a plurality of faces defined by the plurality of elongated members, the plurality of faces comprising at least a top face and a bottom face sized so that one of the ends of the musical instrument can be inserted through the top and bottom faces, such that the top and bottom faces support the musical instrument in the upright orientation.

Clause 24: The assembly of any of clauses 19-23, wherein the frame forms an icosahedron comprising a plurality of equally sized equilateral triangular faces defined by the plurality of elongated members.

Clause 25: The assembly of any of clause 24, wherein the plurality of equally sized equilateral triangular faces are sized so that one of the ends of the musical instrument can be inserted through one or more of the plurality of equally sized equilateral triangular faces in order to support the musical instrument in the upright orientation.

Clause 26: The assembly of any of clause 25, wherein, when inserted through the one or more of the plurality of equally sized equilateral triangular faces, an outer surface of the sidewall of the musical instrument contacts a middle point of each of three elongated members of the plurality of elongated members that form the one or more of the plurality of equally sized equilateral triangular faces. Clause 27: The assembly of any of clauses 19-26, wherein the plurality of elongated members comprise dowels that are about 0.25 inch in diameter and 4.5 inch in length.

Clause 27: The assembly of any of clauses 19-26, wherein the frame is about 11 inches in height and about 13 inches wide.

Clause 28: The assembly of any of clauses 19-27, comprising 30 elongated members and 12 hubs.

Clause 29: The assembly of any of clauses 19-28, wherein the plurality of hubs are spherical or ball-shaped with a diameter of about 1½ inches.

Clause 30: The assembly of any of clauses 19-29, wherein the plurality of hubs comprise five channels, and wherein each hub is directly connected to five of the plurality of elongated members.

Clause 31: A stand for supporting an elongated musical instrument comprising a first end, a second end, and a sidewall extending therebetween, the stand comprising: a plurality of elongated members; and a plurality of hubs comprising multiple channels configured to receive ends of the plurality of elongated members, wherein the plurality of elongated members and the plurality of hubs are connected together forming an open frame configured for the elongated musical instrument to be inserted into or through the frame and to support the elongated musical instrument in an upright orientation.

Clause 32: The stand of clause 31, further comprising a base mounted to the frame for preventing the frame and the musical instrument inserted into or through the frame from tipping over.

Clause 33: The stand of clause 32, wherein the base comprises a substantially flat upper surface configured to contact one of the ends of the elongated musical instrument with the sidewall of the musical instrument supported by the frame.

Clause 34: The stand of clause 33, wherein the plurality of hubs, the plurality of elongated members, and/or the base comprise wood.

Clause 35: The stand of any of clauses 32-34, wherein the frame forms a polyhedron (e.g., an icosahedron, a dodecahedron, or an octahedron) comprising a plurality of faces defined by the plurality of elongated members, the plurality of faces comprising at least a top face and a bottom face sized so that one of the ends of the musical instrument can be inserted through the top and bottom faces, such that the top and bottom faces support the musical instrument in the upright orientation.

Clause 36: The stand of any of clauses 32-35, wherein the frame forms an icosahedron comprising a plurality of equally sized equilateral triangular faces defined by the plurality of elongated members.

Clause 37: The stand of clause 36, wherein the plurality of equally sized equilateral triangular faces are sized so that one of the ends of the musical instrument can be inserted through one or more of the plurality of equally sized equilateral triangular faces in order to support the musical instrument in the upright orientation.

Clause 38: The stand of clause 37, wherein, when inserted through the one or more of the plurality of equally sized equilateral triangular faces, an outer surface of the sidewall of the elongated musical instrument contacts a middle point of each of three elongated members of the plurality of elongated members that form the one or more of the plurality of equally sized equilateral triangular faces.

Clause 39: The stand of any of clauses 32-38, wherein the plurality of elongated members comprise dowels that are ¼ inch in diameter and 4½ inch in length.

Clause 40: The stand of any of clauses 32-39, wherein the frame is about 11 inches in height and about 13 inches wide.

Clause 41: The stand of any of clauses 32-40, comprising 30 elongated members and 12 hubs.

Clause 42: The stand of any of clauses 32-41, wherein the plurality of hubs are spherical or ball-shaped with a diameter of about 1½ inches.

Clause 43: The stand of any of clauses 32-42, wherein the plurality of hubs comprise five channels, and wherein each hub is directly connected to five of the plurality of elongated members.

BRIEF DESCRIPTION OF THE DRAWINGS

The disclosure will be described with reference to the following drawing figures wherein like reference numbers identify like parts throughout.

DESCRIPTION OF THE INVENTION

Figure 1A:
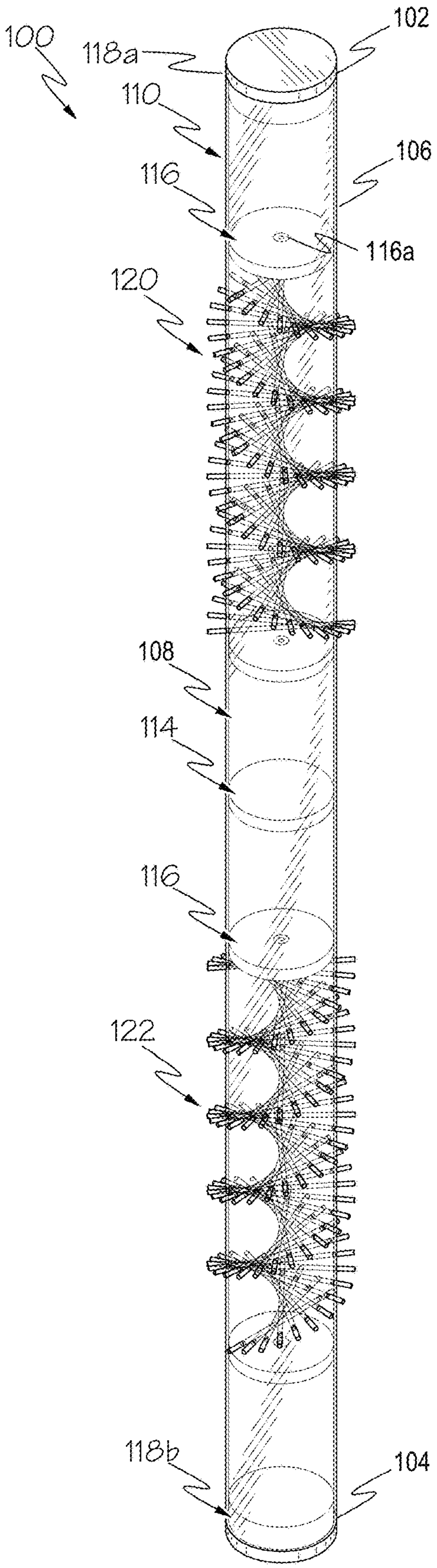
FIG. 1A is perspective view of a musical instrument, according to an aspect of the present disclosure.
Figure 1B:
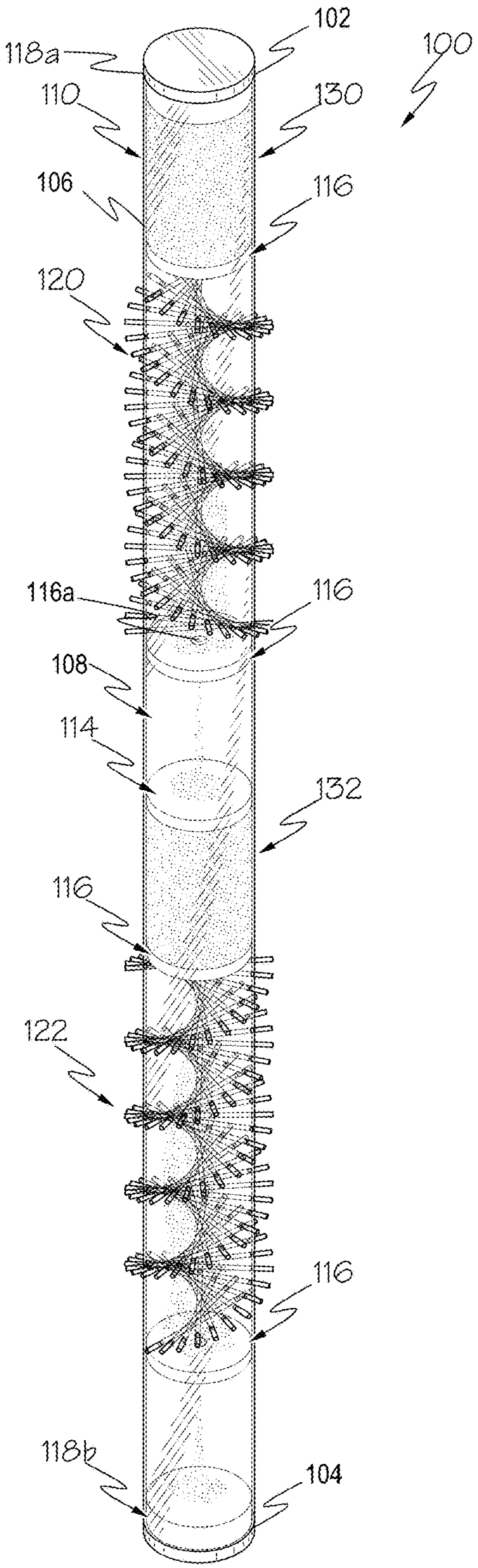
FIG. 1B is another perspective view of the musical instrument of FIG. 1A filled with a fill material, according to an aspect of the present disclosure.
Figure 1C:
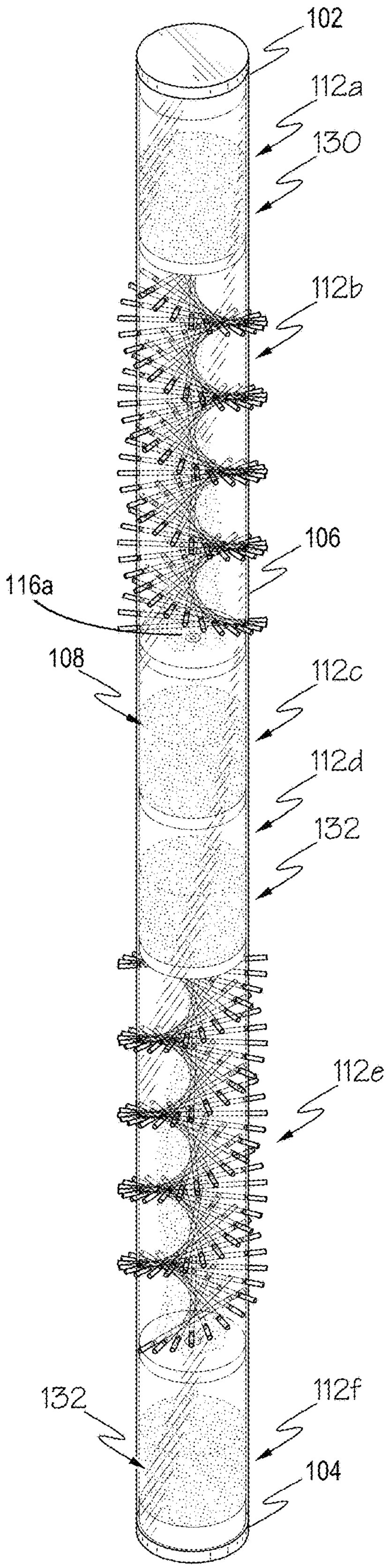
FIG. 1C is another perspective view of the musical instrument of FIG. 1A filled with the fill material.
Figure 1D:
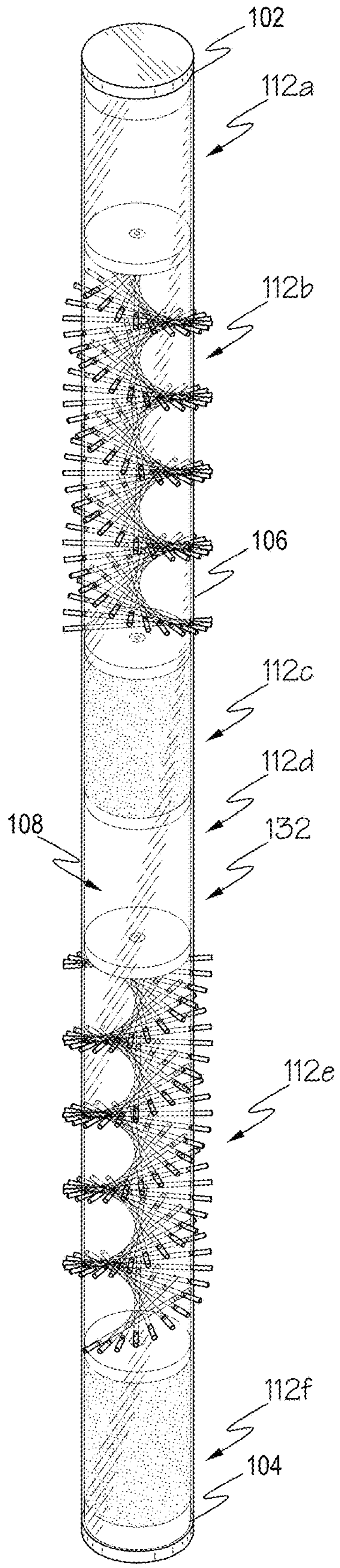
FIG. 1D is another perspective view of the musical instrument of FIG. 1A filled with the fill material.
Figure 1E:
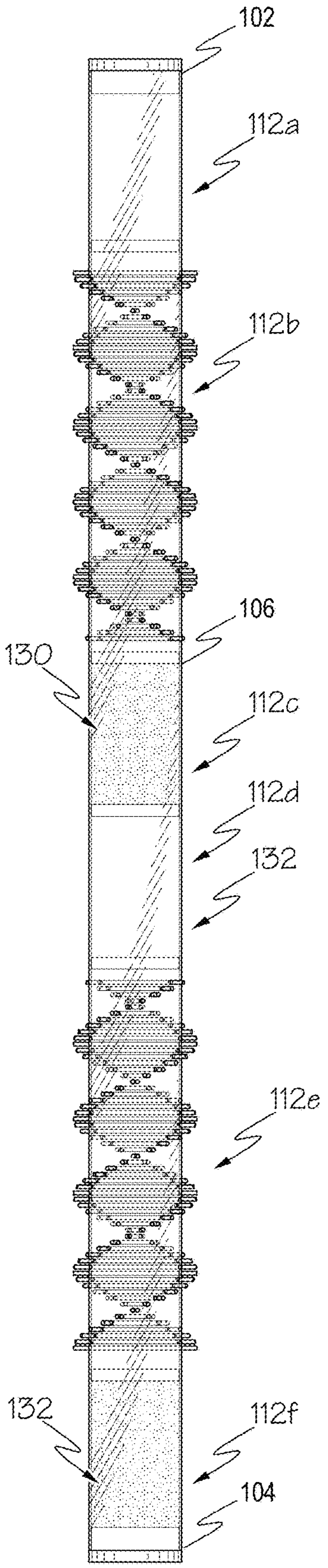
FIG. 1E is a front view of the musical instrument of FIG. 1A.
Figure 1F:
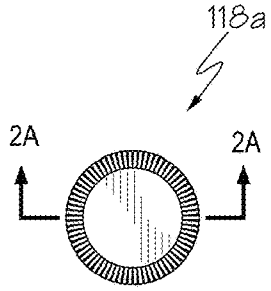
FIG. 1F is a top view of the musical instrument of FIG. 1A.
Figure 2A:
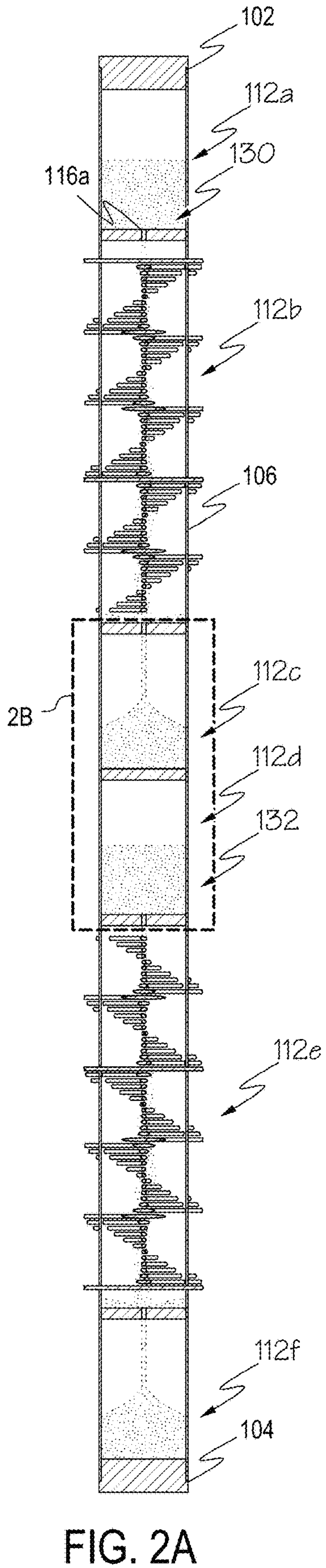
FIG. 2A is a cross-sectional view of the musical instrument of FIG. 1F, taken along line 2A, according to an aspect of the present disclosure.
Figure 2B:
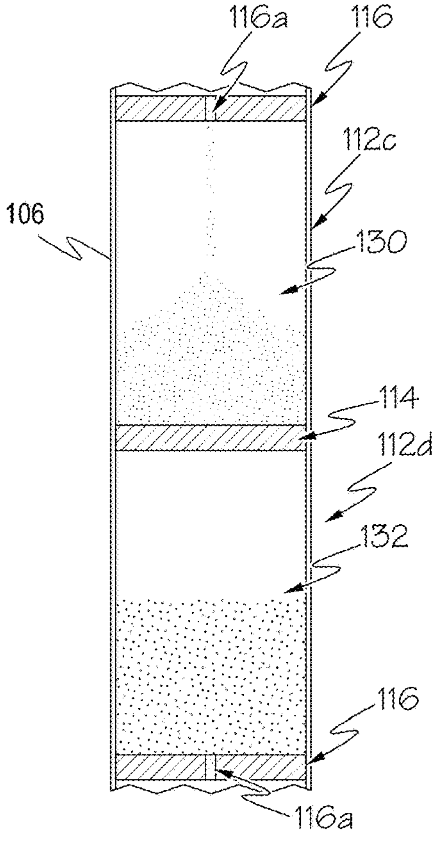
FIG. 2B is a front cross-sectional view of a portion of the musical instrument of FIG. 2A enclosed by shape 2B, according to an aspect of the present disclosure.

As used herein, the singular form of “a”, “an”, and “the” include plural referents unless the context clearly states otherwise.

As used herein, the terms “right”, “left”, “top”, “bottom”, and derivatives thereof shall relate to the invention as it is oriented in the drawing figures. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

For the purposes of this specification, unless otherwise indicated, all numbers expressing, for example, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention. Notwithstanding that the numerical ranges and parameters setting forth the broad scope of the invention are approximations, the numerical values set forth in the specific examples are reported as precisely as possible. Any measured numerical value, however, may inherently contain certain errors resulting from the standard deviation found in their respective testing measurements.

As used herein, the terms "comprising," "comprise" or "comprised," and variations thereof, are meant to be open ended.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

The present disclosure is directed to musical instruments, such as the instrument 100 shown in FIGS. 1A-4, configured to produce a sustained and pleasing sound, referred to herein as a rain-like sound or rain shower effect. The musical instrument 100 can be an elongated structure comprising a housing 110 including a first end 102, a second end 104, and a sidewall 106 extending between the first end 102 and the second end 104. The housing 110 can be a tube, such as a clear plastic tube, which can be closed or capped at both ends 102, 104. The musical instrument 100 also includes particle fill material enclosed within the housing 110, which moves through the housing 110 due to gravity to produce the rain-like sound. The musical instrument 100 can also include deflectors, fins, ribs, protrusions, funnels, barriers, guides, and/or similar structures for diverting or modifying a flow path of the particle fill material moving through the housing 110 in order to create a unique sound. For example, the musical instrument 100 can include ribs, dowels, or rods, extending across the housing 110 and arranged to form helixes or spirals, as shown in the figures.

In some examples, the housing 110 is divided into two or more separate (e.g., fluidly isolated) chambers separated by, for example, one or more solid discs or barriers. Each separate chamber can include rods or ribs arranged to form spirals. Further, each separate chamber can be filled with particles that produce sounds as the particles move through the chambers and contact the spirals. The sound the musical instrument 100 produces can be related to a flow rate for particles moving through the different chambers, as well as to friction and/or percussion characteristics of the housing 110 and of the particle fill material. The musical instrument 100 is intended to be enjoyed for its unique visual aesthetic and its ability to produce the sustained, rain-like sound or rain shower effect. The musical instrument 100 can also produce subsequent echo effect(s), such as simultaneous, sequential, and/or varied fading of sounds, produced by movement of particles through the separate chambers of the instrument 100. In some examples, the clear tube that forms the housing 110 includes many empty areas or areas of negative space, which contribute to the unique visual appearance of the musical instrument 100. For example, negative space can make up about half of the entire instrument 100. During use, the user and viewers see particles move through the negative spaces of the tube creating areas of visual interest, which contribute to the overall visual aesthetic of the instrument 100, while also simultaneously hearing different and/or changing rain-like sounds. Due to this combination of a unique changing visual appearance and multiple sound producing chambers, the musical instrument 100 is expected to engage a user's senses of touch, sight, and sound. Furthermore, the instrument 100 is easy to manipulate and play. In particular, with the exception of rotating or flipping the musical instrument 100, no other external factors, skills, or abilities are needed in order to use and enjoy the instrument 100.

This disclosure is also directed to a stand 210 or support for an elongated musical instrument, such as the musical instrument 100, for holding the instrument 100 in an upright position either during use of the instrument 100 or when the instrument 100 is not in use. Desirably, the stand 210 should be configured to allow a user to easily position the instrument 100 in the stand 210 without, for example, needing to engage locks, latches, or other mechanical features. Also, the user should be able to easily remove the musical instrument 100 from the stand 210, for example, by simply lifting the instrument 100 upwards away from the stand 210 and without needing to disengage any complex mechanical locks or fasteners.

Musical Instrument for Producing a Rain-Like Sound

With reference to FIGS. 1A-2B, the musical instrument 100 comprises the housing 110 comprising the upper or first end 102, the lower or second end 104, and the sidewall 106 extending therebetween. The housing 110 defines an internal volume 108. The first end 102 and the second end 104 can be open ends capped by a plate or disc, as described herein. In other examples, the first end 102 and/or the second end 104 can be closed or partially closed preventing particle fill material from leaking from the housing 110.

The housing 110 can be formed from any of a variety of materials with desirable and/or interesting audible characteristics for producing the rain-like sound. For example, the housing 110 can comprise one or more polymer materials, such as polycarbonate, polyethylene (e.g., high density polyethylene), polyethylene terephthalate (PET), cellulose acetate butyrate (CAB), or combinations thereof. In some examples, the housing 110 can be clear, transparent, or semitransparent (e.g., capable of allowing 80%, 90%, 95%, or 99% of visible light to pass through the sidewall 106 of the housing 110), so that the user and/or viewers can see the particle material move through the housing 110. The housing 110 can be generally columnar or tube-shaped defining the internal volume 108.

The musical instrument 100 can further comprise two end caps 118*a*, 118*b* on opposing ends 102, 104 of the housing 110. For example, the musical instrument 100 can include an upper or first end cap 118*a* over or inserted in the first end 102 of housing 110 and a second or lower end cap 118*b* over or inserted in the second end 104 of the housing 110. The end caps 118*a*, 118*b* be flat discs or plates comprising, for example, polymeric materials, such as ultra-high molecular weight (UHMW) polyethylene or other plastic materials. The musical instrument 100 can be configured to balance or standup in an upright orientation on either the first end cap 118*a* or the second end cap 118*b*.

The end caps 118*a*, 118*b* on each end 102, 104 of the musical instrument 100 are configured to seal the housing 110 keeping particle fill inside the internal volume 108 of the housing 110. Each end cap 118*a*, 118*b* can be fitted so that about ⅔ of the cap 118*a*, 118*b* fits snugly into the housing 110. There may be a lip in each end cap 118*a*, 118*b* so that the other ⅓ of the end cap 118*a*, 118*b* extends from the housing 110 and, for example, can be flush with an outside diameter of the housing 110. The musical instrument 100 can also include fasteners, such as screws, for securing the end caps 118*a*, 118*b* to the housing 110.

The internal volume 108 of the housing 110 may be divided into multiple compartments 112*a*-112*f* defined by one or more barrier discs 114 and one or more open discs 116. As used herein, a barrier disc 114 refers to a disc or plate that is free from openings or perforations, meaning that particle fill material in the internal volume 108 of the housing 110 is prevented from passing between a first compartment and a second compartment through the barrier disc 114. By contrast, an open disc 116 refers to a disc comprising openings or perforations sized to permit particle fill material to pass through the open disc 116, such as between a first compartment and a second compartment of the housing 110.

With continue reference to FIGS. 1A-2B, in some examples, the musical instrument 100 includes one barrier disc 114 located in the middle (e.g., equidistant between the first end 102 and the second end 104) of the housing 110, defining an upper portion of the musical instrument 100 and a lower portion of the musical instrument 100. The barrier disc 114 is configured to seal off and partition the internal volume 108 at a middle point of the housing 110. The barrier disc 114 can separate particle fill of a first type 130 from particle fill of a second type 132, allowing the fill material to move about the internal volume 108, but remain within designated portions or chambers of the housing 110. The barrier disc 114 can be held in place by fasteners or screws, such as by three screws positioned equidistantly around a periphery of the barrier disc 114 and which extend through the sidewall 106 of the housing 110 and into the barrier disc 114.

In examples, the barrier disc 114 can be formed from a 0.375 inch thick wood board, such as from Baltic birch plywood. The barrier disc 114 can also be formed from other types of wood and/or rigid plastic materials.

The musical instrument 100 also includes the open discs 116. For example, as shown in FIGS. 1A-2B, the musical instrument 100 can include four open discs 116 distributed throughout the internal volume 108, with two open discs 116 located in the upper portion between the first end 102 of the musical instrument 100 and the barrier disc 114 and two open discs 116 located in the lower portion of the housing 110 between the barrier disc 114 and the second end 104 of the musical instrument 100.

In some examples, the open discs 116 can have a diameter approximately equal to the diameter of the internal volume 108, such that the open discs 116 nest within the internal volume 108 of the housing 110. In some examples, the open discs 116 can include or define an opening, such as a through-hole 116*a*, extending between a first or upper surface and a second or lower surface of the open disc 116. The opening or through-hole 116*a* is configured to allow the particle fill material to pass through the open disc 116 at a controlled rate. In some examples, the open disc 116 can be a funnel disc having, for example, a through-hole 116*a* extending through the disc 116 aligned with a central axis of the open disc 116 and/or a central longitudinal axis of the housing 110. In some examples, the surfaces of the open disc 116 are substantially flat. In other examples, the surfaces of the open disc 116 can be conical or frustoconical creating a funnel, which directs particles towards the through-hole 116*a*.

Dimensions of the through-hole 116*a* can be selected based on the type of particle fill material being used and/or sounds intended to be produced. For example, the through-hole 116*a* can have a diameter of about 0.25 inch to about 1.0 inch, about 0.375 inch to about 0.5 inch, or preferably about 0.375 inch. In some examples, as described in further detail herein, the musical instrument 100 can include multiple open discs 116 with through-holes 116*a* of different shapes and/or sizes to produce different sounds and/or to allow the particle fill material to pass through the housing 110 at different flow rates. In particular, in some examples, through-holes 116*a* of open discs 116 in the upper portion of the housing 110 are a different size than through-holes 116*a* of open discs 116 in the lower portion of the housing 110.

In some examples, a washer can be affixed over the through-holes 116*a* of the open discs 116 with fasteners, such as with two screws. This combination of the washer and screws provides fixed, consistently sized through-holes 116*a* for the open discs 116, meaning that flow rate for the particle fill material through the through-holes 116*a* is consistent and predictable.

In examples, the open disc 116 can be formed from a 0.375 inch thick wood board, such as from Baltic birch plywood. The open disc 116 can also be formed from other types of wood and/or rigid plastic materials.

In some examples, as discussed above, the musical instrument 100 can include fasteners (e.g., about 5 fasteners to about 50 fasteners, about 10 fasteners to about 40 fasteners, about 20 fasteners to about 30 fasteners, or about twenty-nine (29) fasteners), such as screws, for securing the end caps 118*a*, 118*b*, barrier disc 114, and open discs 116 to the sidewall 106 of the housing 110. The fasteners can be made from a variety of different metal materials. For example, some or all of the fasteners can be stainless steel, while other fasteners, if present, can be made from brass. In a particular example, the musical instrument 100 can include eight (8) stainless steel screws and twenty-one (21) brass screws. The musical instrument 100 can also include washers, such as washers comprised of stainless steel or other metals, for holding the fasteners in place and/or for forming the through-holes 116*a*. For example, the instrument 100 can include from about one to about ten washers or about eight (8) washers, which can correspond to the number of stainless steel screws.

The musical instrument 100 also includes structures for directing a flow of the fill material through the internal volume 108 of the housing 110 in order to produce the desired rain-like sound. For example, the musical instrument 100 can include an upper or first group of ribs, referred to herein as first ribs 120, and a lower or second group of ribs, referred to herein as second ribs 122, arranged in a spiral or helical pattern in the internal volume 108 of the housing 110. As shown in FIGS. 1A-2B, the first ribs 120 can be positioned in the upper portion of the housing 110 (e.g., between the first end cap 118*a* and the barrier disc 114) and the second ribs 122 can be positioned in the lower portion of the housing 110 (e.g., between the barrier disc 114 and the second end cap 118*b*). In some examples, the first ribs 120 can extend through the internal volume 108 of the housing 110 and through the sidewall 106 of the housing 110, such that the first ribs 120 span both inside and outside of the housing 110. The first ribs 120 may comprise ribs having different lengths, such that some extend through the sidewall 106 of the housing 110 and some are contained within the internal volume 108 of the housing 110.

The first ribs 120 may comprise various materials that produce interesting sounds. In one example, the first ribs 120 comprise a polymer. In another example, the first ribs 120 comprise clear acrylic. In other examples, the first ribs 120 comprise one or more of polymer plastics, colored acrylic, wood dowels, brass, aluminum, or other metals. While a spiral or helical pattern is contemplated, the first ribs 120 and the second ribs 122 can also be arranged in any other effective pattern, such as a crossing pattern with rows of parallel ribs 120, 122 arranged at various angles (e.g., about 90 degrees) relative to one another.

In some examples, the musical instrument 100 further comprises the second ribs 122. The second ribs 122 can also be arranged in the spiral or helical pattern. The second ribs 122 can be arranged in a pattern that is opposite the pattern of the first ribs 120. For example, the first ribs 120 can form a right-handed helix or spiral and the second ribs 122 can form a left-handed helix or spiral. As shown in FIGS. 1A-2B, the second ribs 122 extend through the internal volume 108 of the housing 110 and through the sidewall 106 of the housing 110, such that the second ribs 122 span both inside and outside of the housing 110. The second ribs 122 may be comprised of ribs 122 having different lengths, such that some second ribs 122 extend through the sidewall 106 of the housing 110 and some second ribs 122 are contained within the internal volume 108 of the housing 110.

The second ribs 122 can comprise any material suitable for producing a desired or interesting sound. In some examples, the second ribs 122 comprise a polymer. In other examples, the second ribs 122 comprise a clear acrylic. In other examples, the second ribs 122 comprise one or more of polymer plastics, colored acrylic, wood dowels, brass, aluminum, and other metals. The first ribs 120 and the second ribs 122 can be formed from the same type(s) of material or from different type(s) of material.

Design features of the ribs 120, 122 and spirals can be selected based on both acoustic and aesthetic considerations. In particular, the number of first ribs 120 and second ribs 122, number of turns in the spirals or helixes formed by the ribs 120, 122, and/or distance between ribs 120, 122 can be selected to produce desired sounds. Also, spirals can be designed to be visually appealing and interesting. In a particular example, the musical instrument 100 can include about sixty (60) first ribs 120 arranged in a first spiral pattern, and sixty (60) second ribs 122 arranged in a second spiral pattern. As shown in FIGS. 1A-2B, in some examples, the ribs 120, 122 make up the two visible spirals shown in FIGS. 1A-2B. Each of the two visible spirals makes up about a quarter of a total length of the housing 110, such that, in total, about half of the entire housing 110 is marked by this visible spiral.

FIGS. 1B-1E, 2A, and 2B show the musical instrument 100 filled with particles for producing the rain-like sound. For example, the musical instrument 100 can include particle fill of a first type 130 in the upper portion of the housing 110 and particle fill of a second type 132 in the lower portion of the housing 110. In some examples, the musical instrument 100 includes approximately 500,000 particles of the particle fill of the first type 130 and approximately 500,000 particles of the particle fill of the second type 132. In some examples, the particle fill of the first type 130 is housed within a first fill compartment 112*a* between one of the open discs 116 and the first end cap 118*a*. The particle fill of a first type 130 can include, for example, seeds, glass or plastic beads, beans, sands, or combinations thereof selected to yield a desired audible characteristic. In some examples, the particle fill types 130, 132 can be selected for both acoustic and aesthetic qualities, such as shape and/or color. For example, the particle fill of the first type 130 can include amaranth seed, with tan colored particles, and/or clear glass microbeads, which have a natural pale blue color. In one particular example, the particle fill of a first type 130 includes a combination of poppy seeds, other variants of amaranth seed, and size 15/0 glass beads.

The musical instrument 100 also includes the particle fill of the second type 132, which can be housed or contained within a second fill compartment 112*d* between the barrier disc 114 and one of the open discs 116. The particle fill of the second type 132 can also include seeds, glass or plastic beads, beans, sand, or combinations thereof selected to provide desired audible characteristics. As in previous examples, the particle fill of the second type 132 can include amaranth seed, which is tan in color, and/or clear glass microbeads, with a natural pale blue color. In a particular example, the particle fill of a second type 132 can include a combination of poppy seeds, other variants of amaranth seed, and size 15/0 glass beads. In some examples, the particle fill of a first type 130 can be the same (e.g., the same type of particle material, same particle size, same color, etc.) as the particle fill of a second type 132. In other examples, the particle fill of the first type 130 and the particle fill of the second type 132 can be formed from different types of material, materials of the same type but with different particle sizes, and/or particles of different colors.

Playing the musical instrument 100 involves rotating the instrument 100 causing the particle fill of the first type 130 and the particle fill of the second type 132 to move through the internal volume 108 of the housing 110 due to gravitational forces. More specifically, in order to play the musical instrument 100, the user may lift the instrument 100 from its upright or standing position (e.g., with the second end cap 118*b* resting on a table, ground, or another surface) and flip it, placing it over so that the first end cap 118*a* is pointing downward.

Additional features of the musical instrument 100 for producing the rain-like sound will now be described in further detail. These features of the internal volume 108 of the musical instrument 100 are also shown in FIGS. 1A-2C. The musical instrument 100 includes compartments 112*a*-112*f* configured to receive the first type 130 and/or the second type 132 of the fill material. In particular, the inner workings of the musical instrument 100 may be described by breaking the musical instrument 100 down into roughly eight (8) sections or compartments arranged in series along a length of the tube or housing 110. The eight (8) sections or compartments can be of equal length or can have different lengths determined for aesthetic and/or functional considerations. Some of the sections (referred to herein as reservoirs) do not include alternations or particle diverting structures, such as ribs or protrusions. In general, about half of the total internal volume 108 of the housing 110 is made up of the reservoirs.

Each reservoir is sealed on one side by either an end cap 118*a*, 118*b* or by the solid barrier disc 114. The other side of each reservoir is enclosed with one of the open discs 116. As shown in the instrument 100 of FIGS. 1A-2B, there is one open disc 116 per reservoir, so the musical instrument 100 has four open discs 116. Depending on which way the musical instrument 100 is standing and/or rotated and flipped, the two reservoirs located immediately adjacent to the solid barrier disc 114 are either empty, partly full, or completely full of either the first type 130 of particle fill (e.g., for the reservoir above the barrier disc 114) or the second type 132 of particle fill (e.g., for the reservoir below the barrier disc 114).

As discussed above, the through-holes 116*a* of the open discs 116 in the upper portion of the housing 110 can be a different size than through-holes 116*a* for the open discs 116 in the lower portion of the housing 110. The different sized through-holes 116*a* in the open discs 116 can mean that the particle fill material flows through the upper portion of the housing 110 at a different rate than through the lower portion of the housing 116. The different flow rates of the particle materials can produce a unique echo effect. Further, as discussed above, the size of the through-holes 116*a* in the open discs 116 may be adjusted in order to optimize or enhance the echo effect.

The musical instrument 100 is configured such that, when the musical instrument 100 is rotated or flipped, particle fill material in both the upper portion and the lower portion of the housing 110 begin flowing simultaneously and, therefore, begin producing sounds substantially simultaneously. In particular, as the first type 130 of fill material moves through the upper portion of the housing 110, individual particles are deflected off the crossbars or first ribs 120 and the inner surface of the sidewall 106 of the housing 110 producing sounds. In a similar manner, as the second type 132 of fill material moves through the lower portion of the housing 110, individual particles are deflected off the crossbars or second ribs 122 and the inner surface of the sidewall 106 of the housing 110 producing sounds that, for example, can appear to echo sounds produced by the first type 130 of fill material. This echoing effect of similar sounds contributes to the unique overall rain-like sound of the musical instrument 100. In particular, the echoing effect can occur because, for example, sounds produced in one portion of the housing 110 are louder or softer than sounds produced in other portions of the housing 110. Particles can also move through different portions of chambers of the housing 110 at different flow rates, dependent on the size of the through-holes 116*a* through the open discs 116, so that particles in some portions of the housing 110 finish flowing before other sections.

Having described various features of the musical instruments 100 of the present disclosure, specific dimensions and features of a particular non-limiting embodiment or example of a musical instrument 100 will now be provided. However, it is understood that musical instruments 100 can also be made with various different dimensions and/or include only some of the features described below within the scope of the present disclosure.

The exemplary musical instrument 100 comprises a housing 110 comprising CAB tubing with a 3-inch outer diameter, 2.94-inch inner diameter, and a sidewall thickness of 0.03 inch. The tube or housing 110 is 4 feet long. The musical instrument includes end caps 118*a*, 118*b* comprising discs of ultrahigh molecular weight (UHMW) polyethylene that are 3 inches in diameter. The end caps 118*a*, 118*b* are partially inserted into the housing 110 or tube with an overhang or lip of about 0.375 inch extending beyond the end of the housing 110 or tube. The end caps 118*a*, 118*b* are secured to the housing 110 or tube by brass screws (size #4, 0.375-inch length). The open discs 116 of the musical instrument 100 are made from 0.375-inch thick Baltic birch plywood measuring about 2.96 inches in diameter. The open discs 116 include a through-hole 116*a* with a diameter of 0.375 inch drilled through a center of the open disc 116. Metal washers (0.05 inch thick by 0.625 inch in diameter) are positioned in a depression on surfaces of the open discs 116 (e.g., created with a Forstner bit) around a 0.375 inch hole. Stainless steel screws (e.g., size #6, ¼" length, pan head) are used for securing the open discs 116 to the tube. The upper portion of the tube is filled with amaranth seed. The lower portion of the tube is filled with size 15/0 glass beads.

For a musical instrument 100 sized and configured as described above, the rain-like sound produced is about 66 decibels in intensity measured from about one foot from the housing 110 or tube. In some instances, the musical instrument 100 produces sounds of varying intensity or loudness, such as with a range of from about 46 decibels (e.g., when the entire instrument 100 is filled with poppy seeds) to about 75 decibels (when the entire instrument 100 is filled with size 15/0 glass beads).

Duration of rain-like sound for this exemplary musical instrument 100 ranges from about 2 minutes to about 10 minutes, although it is understood that the dimensions and components may be adjusted to accommodate lengths of time outside that range. The glass microbeads sound may fade after about 3 minutes to about 10 minutes after flipping. The amaranth seed sound may fade after about 3.5 minutes after flipping. Other variations and/or fill materials may last up to 8 minutes after flipping.

In another example, the musical instrument 100 can be formed from a CAB tube with an outside diameter of 4.5 inches that is 4 feet in length. The end caps 118*a*, 118*b* are 4.5 inches in diameter and are inserted into the housing 110 or tube. The end caps 118*a*, 118*b* have a lip or overhang of about 0.375 inch beyond the ends of the housing 110 or tube. The four open discs 116 are formed from Baltic birch plywood that is 0.375 inch thick and 4.26 inches in diameter. The through-hole 116*a* and washer measurements are the same as in the previous example. The stainless steel screws and brass screws are also the same as in the previous example. The single solid barrier disc 114 is formed from Baltic birch plywood and measures 0.375 inch thick and 4.26 inches in diameter. The acrylic or wood ribs 120, 122 comprise dowel rods ranging from 0.125 inch to 0.1875 inch thick. The ribs 120, 122 are 5.55 inches long.

Musical Instrument Stand for an Elongated Instrument

Figure 3:
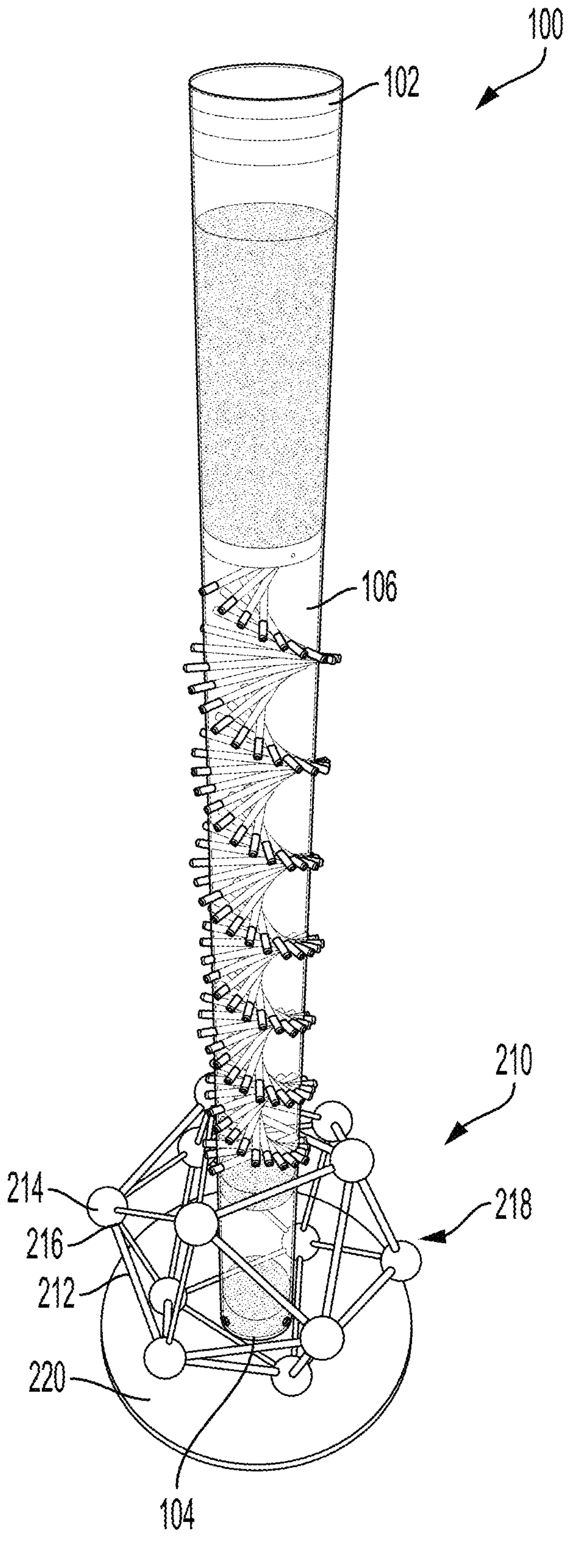
FIG. 3 is a perspective view showing an example of a musical instrument and stand, according to an aspect of the present disclosure.
Figure 4:
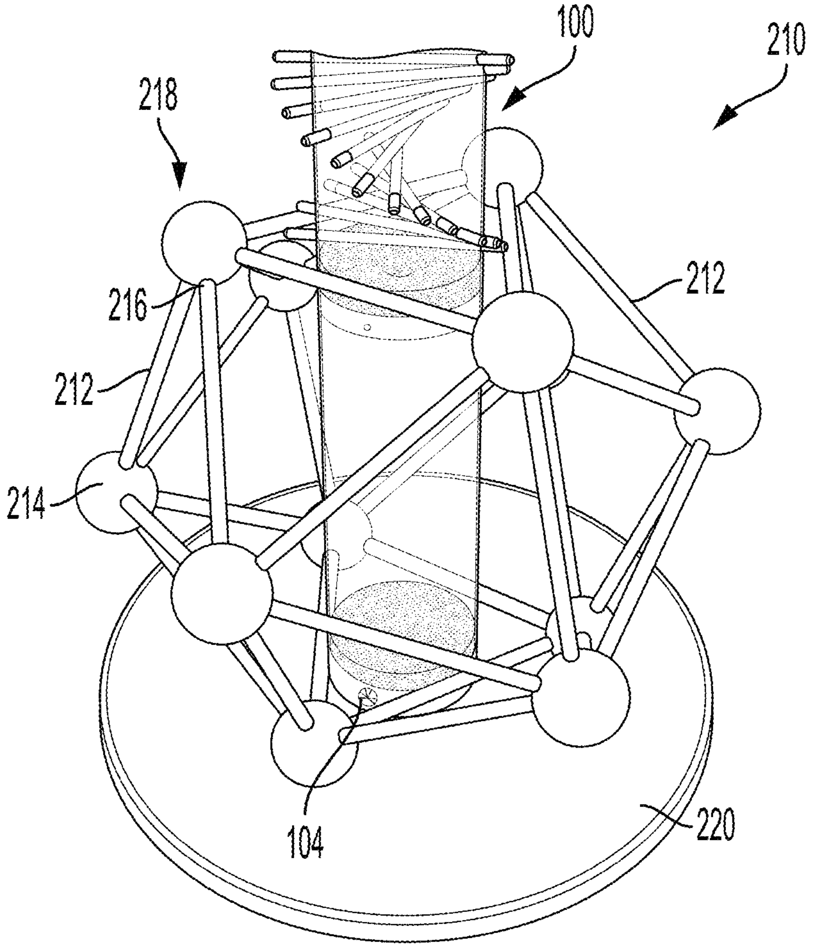
FIG. 4 is an enlarged perspective view of the musical instrument and stand of FIG. 3.
Figure 5:
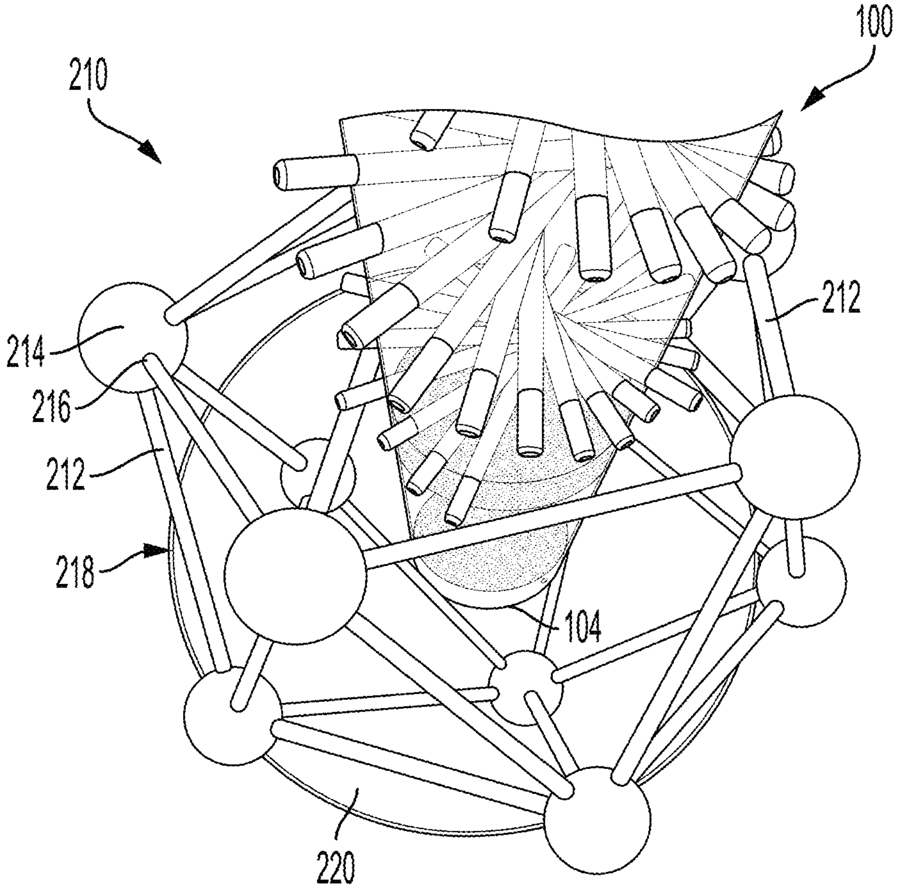
FIG. 5 is another enlarged perspective view of the musical instrument and stand of FIG. 3.
Figure 6:
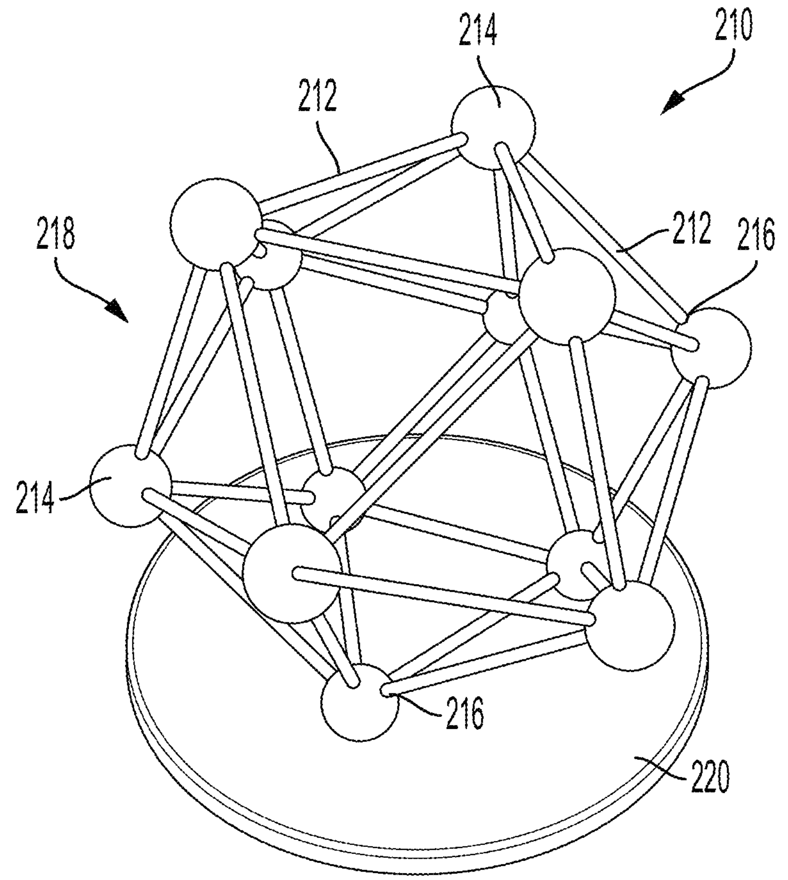
FIG. 6 is a perspective view of a stand for a musical instrument, according to an aspect of the present disclosure.
Figure 7:
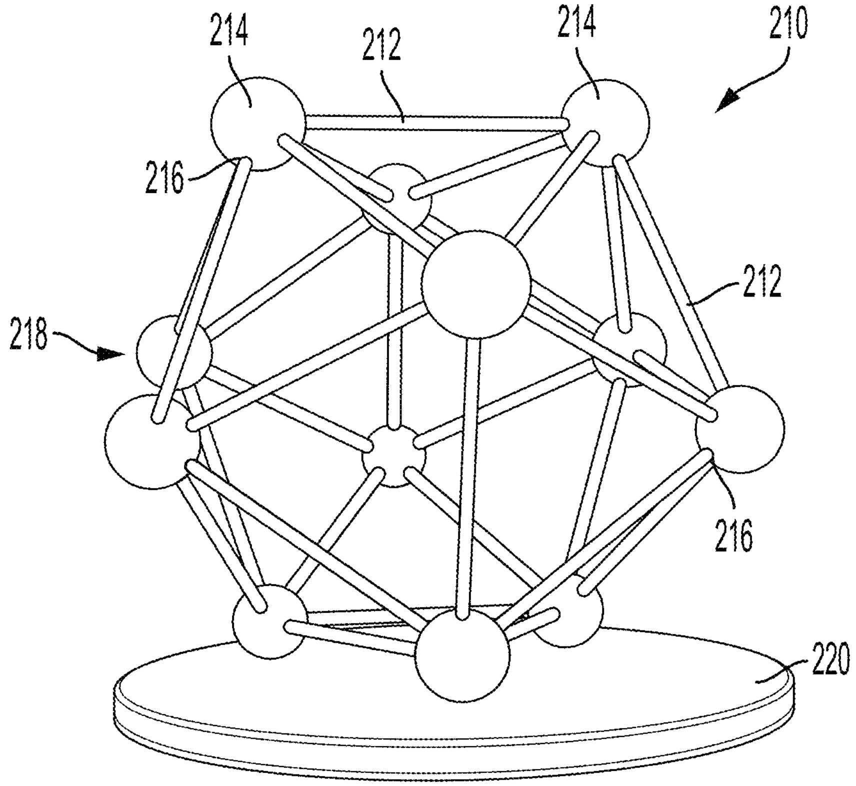
FIG. 7 is a left side view of the musical instrument stand of FIG. 6.
Figure 8:
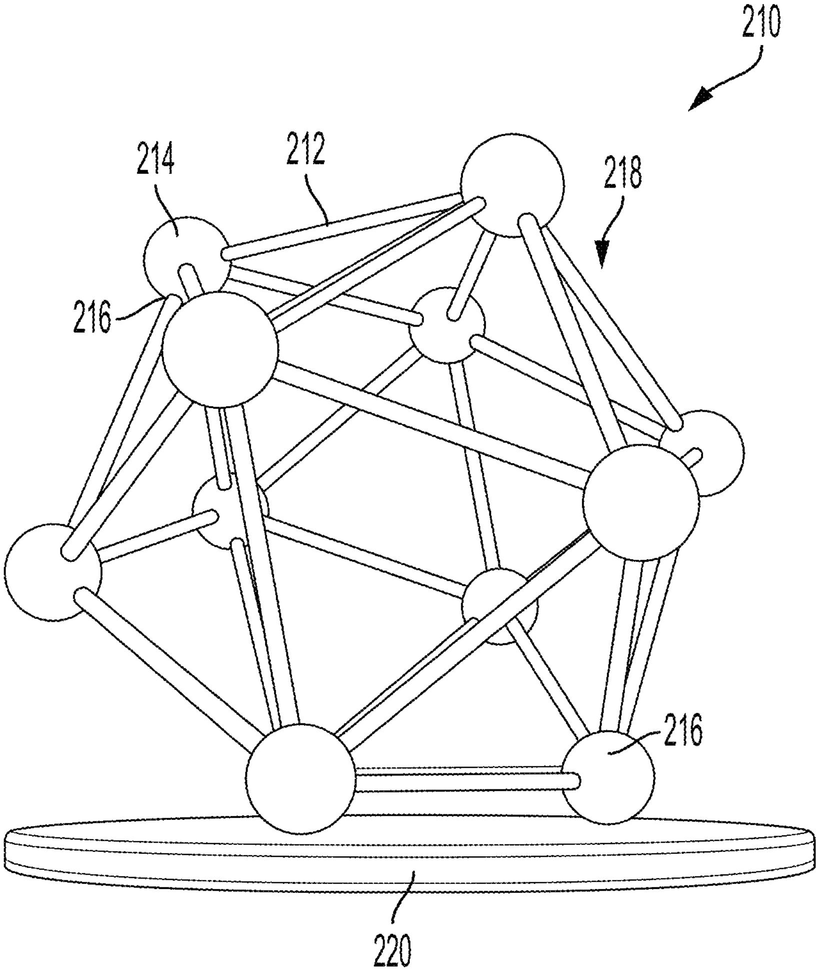
FIG. 8 is a right side view of the musical instrument stand of FIG. 6.
Figure 9:
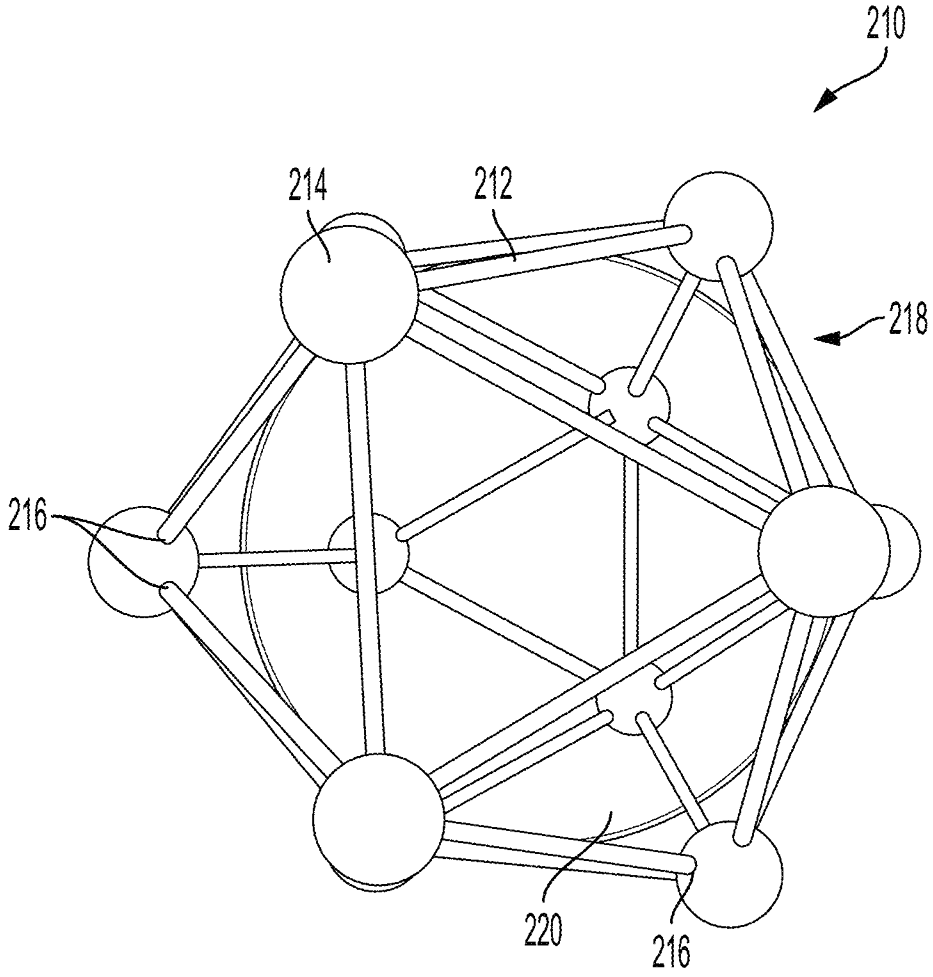
FIG. 9 is a top view of the musical instrument stand of FIG. 6.
Figure 10:
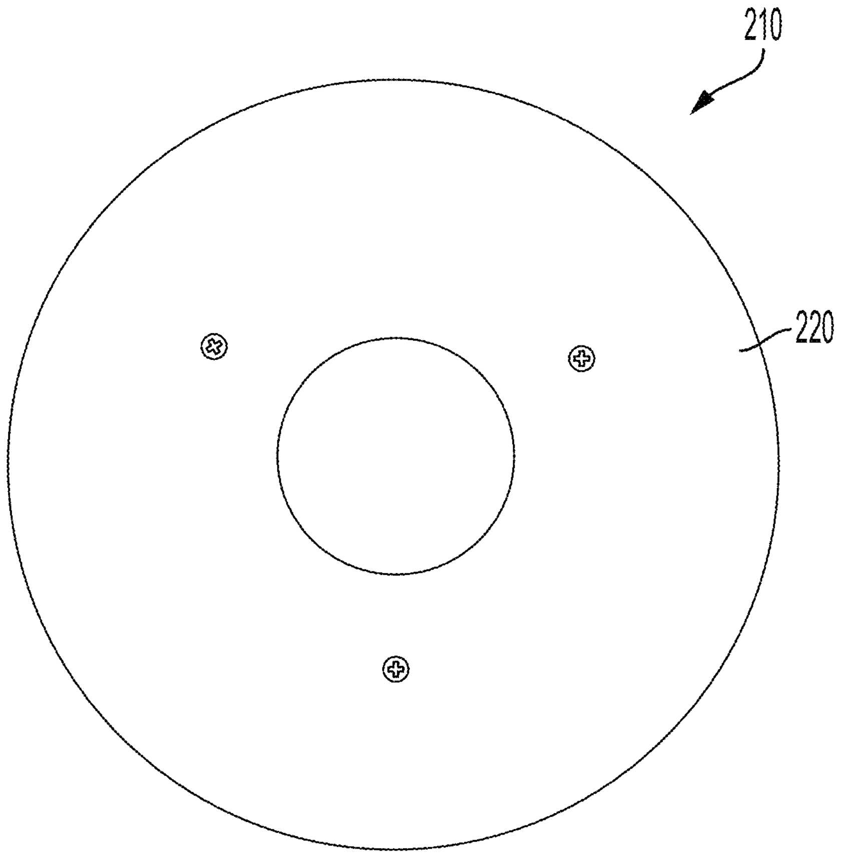
FIG. 10 is a bottom view of the musical instrument stand of FIG. 6.

The present disclosure is also directed to stands 210 for supporting an elongated musical instrument, such as the musical instrument 100 shown in FIGS. 1A-2B, in an upright orientation. As used herein, an "elongated" musical instrument or member refers to a structure having an axial length that is longer than a thickness, width, diameter, or latitudinal length of the structure. For example, an elongated instrument or member can be shaped as and/or comprise a tube, beam, strut, plank, or similar structure. As used herein, an "upright orientation" refers to an orientation in which a longitudinal axis of the elongated musical instrument is transverse or substantially transverse to the ground and/or to a planar surface (e.g., a table top) on which the musical instrument is placed or rests. FIGS. 3-5 show the musical instrument 100 supported in an upright orientation by an exemplary stand 210 including features of the present disclosure. FIGS. 6-10 show different views of the stand 210 without the musical instrument 100. FIG. 11A shows a musical instrument supported by another example of a stand. FIG. 12A shows a musical instrument supported by another example of a stand. It is understood that the stand 210 can also be used to support other types of elongated musical instruments or other elongated structures or devices.

As shown in FIGS. 3-10, the stand 210 for supporting an elongated musical instrument, such as the instrument 100 shown in FIGS. 1A-4, comprises elongated members 212 and hubs 214 comprising multiple openings, cavities, or channels 216 configured to receive ends of the elongated members 212 by, for example, a friction-fit engagement. The elongated members 212 and hubs 214 are connected together forming an open frame 218 configured so that the elongated musical instrument 100 can be inserted into or through the frame 218. When inserted into or through the open frame 218, the frame 218 supports the elongated musical instrument 100 in the upright orientation.

The stand 210 can further comprise a base 220, such as a flat disc, shelf, plate, tray, or similar structure, mounted to the frame 218 for preventing the frame 218 and musical instrument 100 inserted into or through the frame 218 from tipping over. The base 220 can comprise a substantially flat upper surface configured to contact one of the ends 102, 104 of the elongated musical instrument 100 with the sidewall 106 of the musical instrument 100 supported by the frame 218.

The elongated members 212, hubs 214, and base 220 can be formed from any suitable rigid and hard material sufficient to support the musical instrument 100, such as rigid plastic, wood, or ceramic. In some examples, the elongated members 212 comprise wood dowels that are about ¼ inch in diameter and 4½ inch in length. In some examples, the frame 218 can have a height of about 11 inches and can be about 13 inches wide. In some examples, the hubs 214 can be spherical or ball-shaped with a diameter of about 1½ inches. The channels 216 of the hubs 214 can be slightly wider than ¼ inch in diameter and sized to receive and form the friction fit engagement with ends of the elongated members 212 or dowels to hold the elongated members 212 or dowels in place.

In some examples, the frame 218 forms or is shaped as a polyhedron (e.g., an icosahedron, a dodecahedron, or an octahedron) comprising multiple openings or faces defined by the elongated members 212. In particular, the frame 218 can include a bottom or lower face proximate to the base 220 and a top or upper face opposite the bottom face. The top face and the bottom face can be sized so that one of the ends 102, 104 of the musical instrument 100 can be inserted through the top and bottom faces of the frame 218 in order for the frame 218 to support the musical instrument 100 in the upright orientation.

In a particular example, as shown in FIGS. 3-10, the frame 218 forms or is shaped as an icosahedron with multiple (e.g., twenty) equally sized equilateral triangular faces defined by the elongated members 212. The equilateral triangular faces can be sized so that one of the ends 102, 104 of the musical instrument 100 can be inserted through one or more of the equilateral triangular faces in order to support the musical instrument 100 in the upright orientation. Furthermore, the frame 218 can be sized so that when the musical instrument 100 is inserted through an equilateral triangular face of the frame 218 an outer surface of the sidewall 106 of the elongated musical instrument 100 contacts a middle point or portion of each of the three elongated members 212 that form or define the equilateral triangular face. In order to form the icosahedron, the stand 210 comprises thirty (30) elongated members 212 and twelve (12) hubs 214, as shown in FIGS. 3-10. Each hub 214 includes five channels 216 so that ends of five elongated members 212 can be directly connected to each hub 214.

Figure 11B:
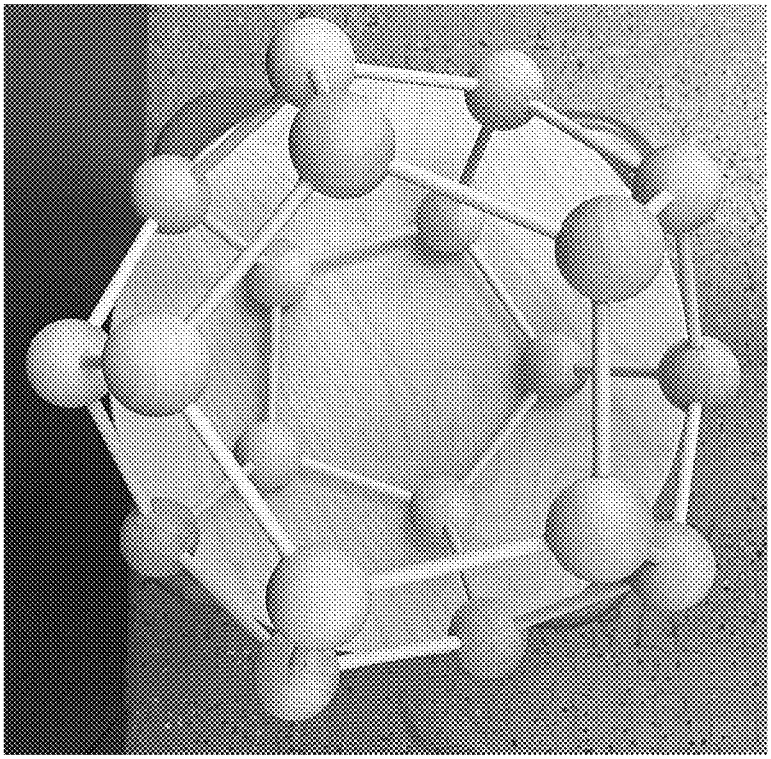
FIG. 11B is a top view of the musical instrument stand of FIG. 11B.
Figure 11A:
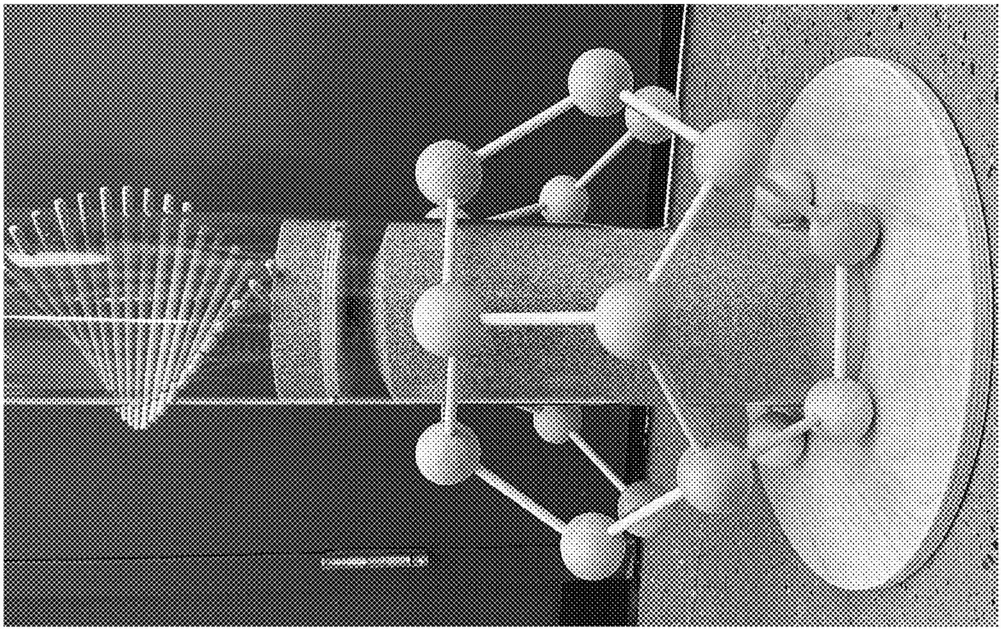
FIG. 11A is a side view of another example of a musical instrument and stand, according to an aspect of the present disclosure.

FIGS. 11A and 11B show another example of a stand 210 for supporting an elongated musical instrument including features of the present disclosure. As shown in FIGS. 11A and 11B, the stand 210 forms a dodecahedron (e.g., a twelve-sided polyhedron). The stand 210 comprises a frame 218 formed from dowels (e.g., wood dowels that are 0.25 inch thick and 2.5 inches in length) and hubs (e.g., wood hubs that are 1.5 inches in diameter). The stand 210 includes thirty (30) of the elongated members or dowels. Unlike in the previous example, the stand 210 includes twenty (20) hubs. Each hub includes three channels sized to receive the dowels. The frame 218 formed from the dowels and hubs can be about 10 inches tall and about 12 inches wide. Unlike the icosahedron stand 210, which has equilateral triangular faces, the dodecahedron stand 210 has equilateral pentagonal faces. Beneficially, the dodecahedron stand 210 can have larger openings than the icosahedron stand 210. Therefore, the dodecahedron stand 210 can be used for supporting larger elongated musical instruments (e.g., instruments having a wider outer diameter) compared to the previously described icosahedron stand 210.

Figure 12B:
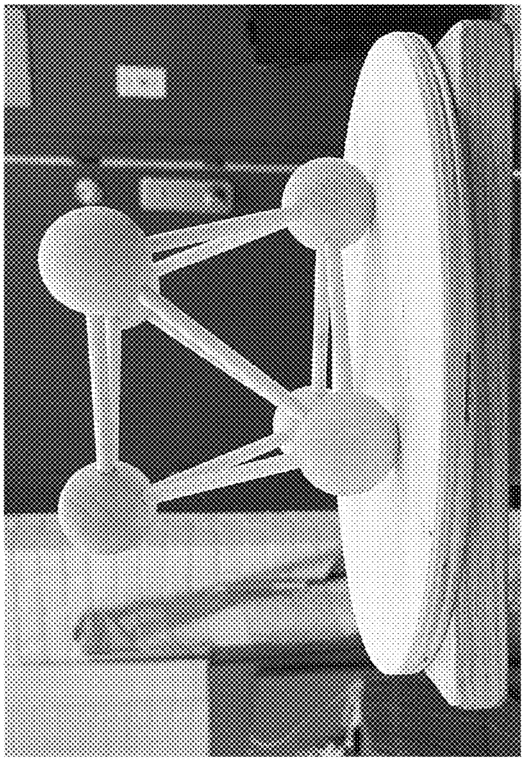
FIG. 12B is a side view of the musical instrument stand of FIG. 12A.
Figure 12A:
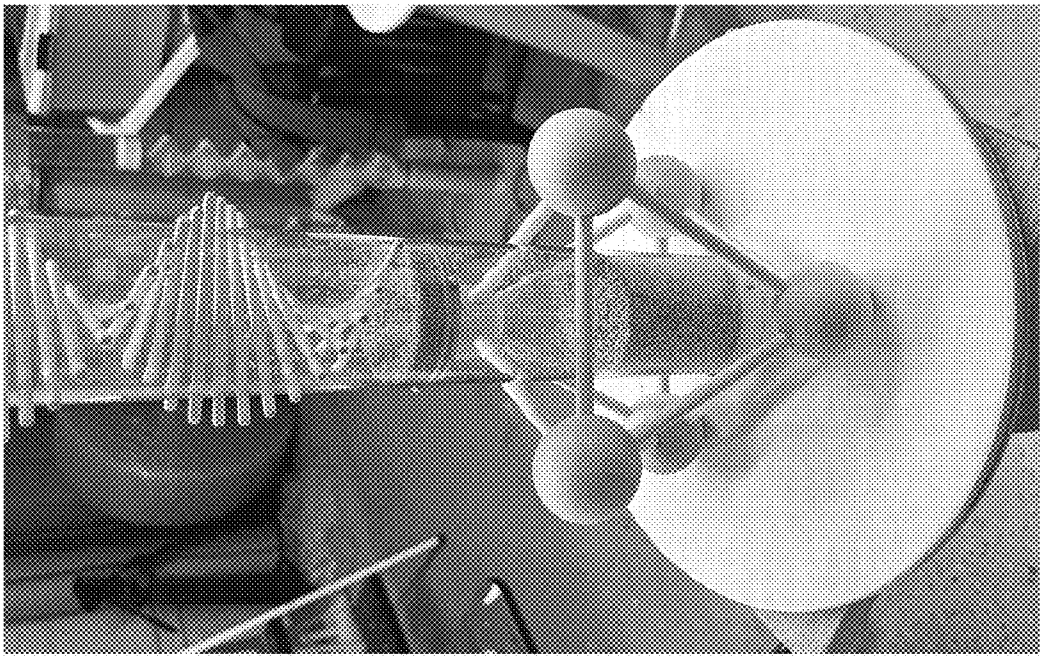
FIG. 12A is a perspective view of another example of a musical instrument and stand, according to an aspect of the present disclosure.
Figure 12C:
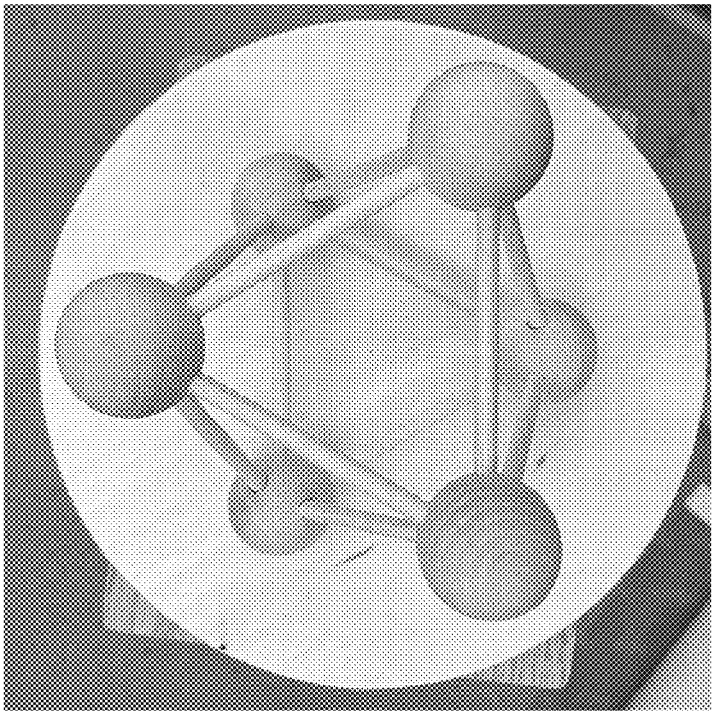
FIG. 12C is a top view of the musical instrument stand of FIG. 12A.

FIGS. 12A-12C show another example of a stand 210 for supporting an elongated musical instrument including features of the present disclosure. As shown in FIGS. 12A-12C, the stand 210 forms an octahedron (e.g., an eight-sided polyhedron). The stand 210 in FIGS. 12A-12C comprises a frame 218 including six (6) hubs. The hubs can be wooden hubs that are 1.5 inches in diameter and can include four channels in each hub. The stand 210 also includes twelve (12) elongated members (e.g., wooden elongated members that are 0.25 inch thick and 2.75 inches in length) connected between the hubs forming the frame 218. The octahedron stand 210 of FIGS. 12A-12C is about 5 inches tall and about 6 inches wide. As in previous examples, the stand 210 can also include a circular base (e.g., a base that is about 8 inches to about 10 inches in diameter) mounted to the frame 218.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A musical instrument comprising:

a housing comprising an open first end, an open second end, and a sidewall extending therebetween, the housing defining an internal volume;

a first end cap covering the open first end of the housing;

a second end cap covering the open second end of the housing;

a barrier disc positioned in the internal volume dividing the internal volume into an upper portion and a lower portion;

a first plurality of ribs positioned in the upper portion of the musical instrument arranged in a first pattern;

a second plurality of ribs positioned in the lower portion of the musical instrument arranged in a second pattern;

a first particle fill material in the upper portion of the internal volume; and a second particle fill material in the lower portion of the internal volume.

2. The musical instrument of claim 1, wherein the housing comprises a transparent or translucent material.

3. The musical instrument of claim 1, wherein the first plurality of ribs extend through openings in the sidewall of the housing and through the upper portion of the internal volume, and/or wherein the second plurality of ribs extend through the openings in the sidewall of the housing and through the lower portion of the internal volume.

4. The musical instrument of claim 1, wherein the first particle fill material and/or the second particle fill material comprises seeds.

5. The musical instrument of claim 1, wherein the first particle fill material and/or the second particle fill material comprises glass beads.

6. The musical instrument of claim 1, further comprising at least one first open disc positioned in the upper portion of the internal volume and at least one second open disc positioned in the lower portion of the internal volume.

7. The musical instrument of claim 6, wherein the at least one first open disc and the at least one second open disc comprise a through-hole extending between a first surface and a second surface of the at least one first open disc or the at least one second open disc.

8. The musical instrument of claim 7, wherein a central axis of the at least one first open disc and/or the at least one second open disc is aligned with the through-hole of the at least one first open disc and/or the at least one second open disc.

9. The musical instrument of claim 7, wherein the through-hole of the at least one first open disc comprises a first diameter and the through-hole of the at least one second open disc comprises a second diameter, which is different than the first diameter.

10. The musical instrument of claim 1, further comprising:

multiple first open discs positioned in the upper portion of the internal volume for guiding the first particle fill material through the upper portion, the multiple first open discs comprising a first opening having a first diameter; and multiple second open discs positioned in the lower portion of the internal volume for guiding the second particle fill material through the lower portion, the multiple second open discs comprising a second opening having a second diameter, which is different than the first diameter.

11. The musical instrument of claim 1, wherein the first plurality of ribs positioned in the upper portion and/or the second plurality of ribs positioned in the lower portion is arranged in a helical or spiral pattern.

12. The musical instrument of claim 1, wherein one of the first particle fill material or the second particle fill material comprise amaranth seed comprising tan colored particles, and wherein the other of the first particle fill material or the second particle fill material comprises glass microbeads that are a blue color.

13. A musical instrument assembly, comprising:

the musical instrument of claim 1; and a stand for supporting the musical instrument, comprising:

a plurality of elongated members; and a plurality of hubs comprising multiple channels configured to receive ends of the plurality of elongated members, wherein the plurality of elongated members and the plurality of hubs are connected together forming an open frame configured for the musical instrument to be inserted into or through the frame and to support the musical instrument in an upright orientation.

14. The assembly of claim 13, wherein the stand further comprises a base mounted to the frame for preventing the frame and the musical instrument inserted into or through the frame from tipping over.

15. The assembly of claim 14, wherein the base of the stand comprises a substantially flat upper surface configured to contact one of the ends of the musical instrument with the sidewall of the musical instrument supported by the frame.

16. The assembly of claim 13, wherein the frame forms a polyhedron comprising a plurality of faces defined by the plurality of elongated members, the plurality of faces comprising at least a top face and a bottom face sized so that one of the ends of the musical instrument can be inserted through the top and bottom faces, such that the top and bottom faces support the musical instrument in the upright orientation.

17. The assembly of claim 13, wherein the frame forms an icosahedron comprising a plurality of equally sized equilateral triangular faces defined by the plurality of elongated members, and wherein the plurality of equally sized equilateral triangular faces are sized so that one of the ends of the musical instrument can be inserted through one or more of the plurality of equally sized equilateral triangular faces in order to support the musical instrument in the upright orientation.

18. The assembly of claim 17, wherein, when inserted through the one or more of the plurality of equally sized equilateral triangular faces, an outer surface of the sidewall of the musical instrument contacts a middle point of each of three elongated members of the plurality of elongated members that form the one or more of the plurality of equally sized equilateral triangular faces.

19. A musical instrument comprising:

a housing comprising an upper end, a lower end, and a sidewall extending therebetween, the housing defining an internal volume;

a barrier disc positioned in the internal volume dividing the internal volume into an upper portion and a lower portion;

a plurality of upper ribs positioned in the upper portion of the musical instrument arranged in a first pattern;

at least two upper open discs positioned in the upper portion of the musical instrument, wherein the plurality of upper ribs are disposed between the at least two upper open discs;

upper particle fill material enclosed in the upper portion of the internal volume;

a plurality of lower ribs positioned in the lower portion of the musical instrument arranged in a second pattern;

at least two lower open discs positioned in the lower portion of the musical instrument, wherein the plurality of lower ribs are disposed between the at least two lower open discs; and lower particle fill material enclosed in the lower portion of the internal volume.

20. A stand for supporting an elongated musical instrument comprising a first end, a second end, and a sidewall extending therebetween, the stand comprising:

a plurality of elongated members;

a plurality of hubs comprising multiple channels configured to receive ends of the plurality of elongated members, wherein the plurality of elongated members and the plurality of hubs are connected together forming an open frame, the open frame forming a polyhedron comprising a plurality of triangular faces defined by the plurality of elongated members, the plurality of triangular faces comprising at least a top triangular face and a bottom triangular face sized so that one of the ends of the musical instrument can be inserted through the top triangular face and the bottom triangular face, such that the top triangular face and the bottom triangular face support the musical instrument in an upright orientation; and a base mounted to the open frame for preventing the open frame and the musical instrument inserted through the top triangular face and the bottom triangular face from tipping over, wherein the base comprises a substantially flat upper surface configured to contact one of the ends of the elongated musical instrument with the sidewall of the musical instrument supported by the open frame, and wherein, when inserted through the top triangular face and the bottom triangular face, an outer surface of the sidewall of the elongated musical instrument contacts each of three elongated members of the top triangular face and the bottom triangular face.

21. The stand of claim 20, wherein the frame forms an icosahedron and the plurality of triangular faces defined by the plurality of elongated members are equally sized equilateral triangular faces.

22. The stand of claim 20, comprising 30 elongated members and 12 spherical or ball-shaped hubs.

23. The stand of claim 20, wherein the plurality of hubs each comprises five channels, and wherein each hub is directly connected to five of the plurality of elongated members.

* * * * *